Sept. 2, 1941.  J. O. E. JOHANSSON  2,254,894
COMBINATION BLOCK GAUGE SET
Filed Sept. 29, 1939   2 Sheets-Sheet 1
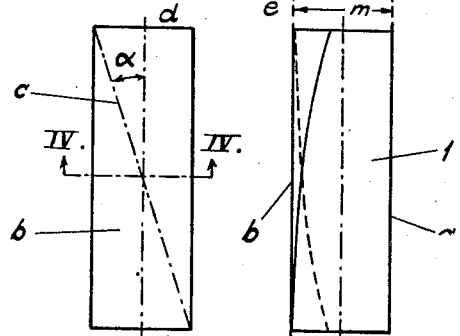
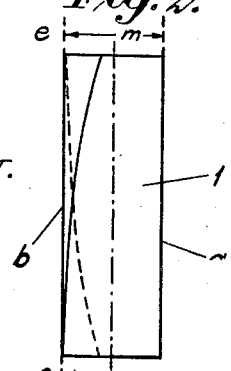
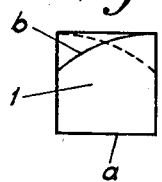
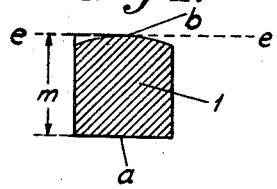
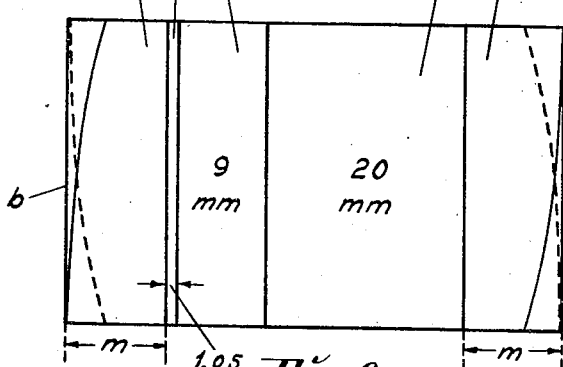
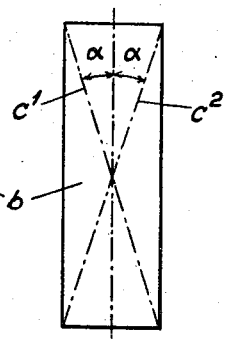
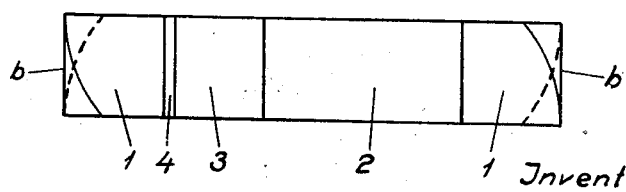
Inventor:
John Olof Edvard Johansson
by George Bayard Jones
Attorney Sept. 2, 1941.    J. O. E. JOHANSSON    2,254,894
COMBINATION BLOCK GAUGE SET
Filed Sept. 29, 1939    2 Sheets-Sheet 2

Inventor:
John Olof Edvard Johansson
by George Bayard Jones,
Attorney

Patented Sept. 2, 1941

2,254,894

UNITED STATES PATENT OFFICE 2,254,894

COMBINATION BLOCK GAUGE SET

John Olof Edvard Johansson, Balgviken, near Eskilstuna, Sweden, assignor to Aktiebolaget C. E. Johansson, Eskilstuna, Sweden, a company of Sweden Application September 29, 1939, Serial No. 297,095
In Sweden October 8, 1938

6 Claims. (Cl. 33—168)

The present invention relates to an improvement in combination block gauge sets of the kind which consist of a plurality of gauge blocks which may be combined to form different measures, and which are made of hardened steel, or optionally, of a stainless steel alloy. The present invention has for its purpose to provide a combination block gauge set of this kind by means of which the working measure of a snap gauge may be adjusted and checked.

According to accepted international rules, the so-called ISA system—ISA denotes the International Federation of National Standardizing Associations—when measuring shafts by means of snap gauges, the influence must be taken into account that the tangential measuring pressure has on the extension or elongation of the gauge due to its flexibility. For this reason distinction must be made between the proper or set measure of a snap gauge and the working measure thereof, the proper measure of the gauge being the measure existing between its measuring surfaces at no load, and the working measure of the gauge, which is always somewhat greater than the proper measure due to the said extension or elongation, being defined as the measure of the reference disk over which the snap gauge barely slides at a given tangential load, the handling load. If no special load is stated, the weight of the gauge is the load in question.

According to the abovementioned rules, therefore, it is only possible with the combination block gauge sets heretofore known to check or measure the proper or set measure of the snap gauge, whereas special reference disks are necessary for a satisfactory checking of the working measure of the gauge. Accordingly, every manufacturer who wishes to follow the said international rules, must procure a great number of such reference disks, which, of course, entails a considerable cost.

This disadvantage is obviated by the present invention, which is mainly characterized by the combination block gauge set comprising, in addition to the ordinary gauge blocks, at least two additional blocks each of which is provided, in addition to an accurate plane measuring surface, with a ridge, or ridges, on the side opposite to the said measuring surface, the top generatrix i. e. the top line or top, of which ridge, or ridges, is positioned in a plane which is parallel to the said measuring surface and is located at a certain distance therefrom which distance is the measure or dimension of the block in question. The top line or generatrix of the ridge may be straight, curved, angular or a broken line. These additional blocks are intended to be placed one at each end of the composite block or combination when built up of one or more ordinary blocks to form the measure or dimension desired. A combination block gauge set which is provided with these additional end blocks, can thus replace practically all those reference disks of various sizes which have heretofore been required for checking the working measures of the snap gauges used in a plant.

In order that the necessary accuracy shall be secured in practice, when checking the working measures of the snap gauges by means of a combination block gauge set arranged in this manner, the ridge on at least one of the two additional blocks should be located in such manner that at least a portion of its top line or generatrix forms an acute angle to the longitudinal center line of the block, so that at least portions of the top lines or top generatrices of the two additional blocks which are placed one at each end of the combination, will intersect when viewed from one end. In this manner the great advantage is attained that, when checking a snap gauge, the gauge will be positively guided relatively to the combination in such manner that the measuring plugs of the gauge always come in engagement with the top generatrices of the end blocks, that is to say, slide over the greatest measure or dimension of the combination of blocks. With this arrangement it is immaterial, therefore, whether the ridges of the end blocks are formed as cylinder segments having a radius of curvature equal to half the dimension of the combination, or if they have another radius of curvature.

The accompanying drawings illustrate by way of example two constructional forms of the invention.

Figs. 1, 2 and 3 show an additional end block according to the invention, viewed from three different sides, and Fig. 4 shows a cross section of the block on the line IV—IV in Fig. 1.

Figs. 5, 6 and 7 show a side view, a top view, and an end view, respectively, of a composite block or combination which is built up of three ordinary blocks and two additional end blocks according to the invention.

Figure 8:
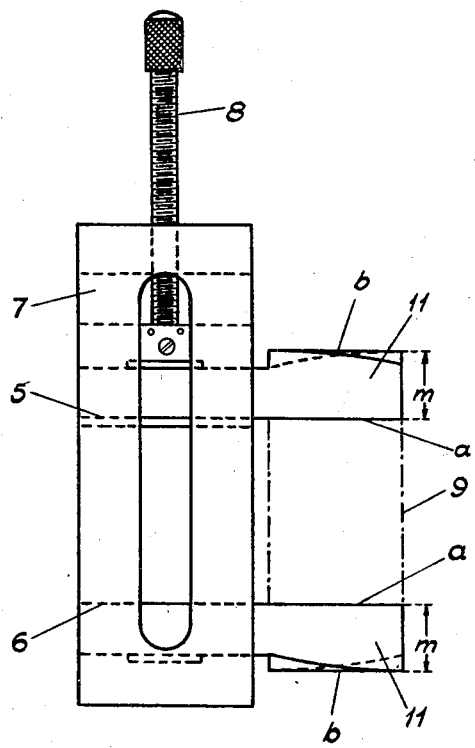
Figs. 8 and 9 show two elevations at right angles to one another of a modified constructional form in which the additional end blocks are longer than the ordinary gauge blocks.

As illustrated in Figs. 1 to 4 inclusive, the additional end block 1 according to the invention is provided with an accurately plane measuring surface $a$, which suitably has the same rectangular shape and size as the measuring surfaces of the ordinary blocks of the combination block gauge set, and is provided with a ridge $b$ on the side opposite to the said measuring surface, which ridge is shaped in the present case as a portion of a cylindrical surface. In the constructional form illustrated, the said ridge $b$ extends in the diagonal direction of the block, so that its top generatrix which is indicated by the dot and dash line $c$ in Fig. 1, forms an angle $\alpha$ with the longitudinal center line $d$—$d$ of the block. The ridge $b$ must always be so shaped, however, that its top generatrix $c$ lies in a plane $e$—$e$ which is parallel to the accurately plane measuring surface $a$ and is located at a certain distance $m$ therefrom. This distance $m$ is the measure or dimension of the end block.

Figs. 5 to 7 inclusive show, on an enlarged scale, a composite block which is built up of three ordinary blocks 2, 3 and 4, which may, for instance, have the dimensions 20 mm., 9 mm. and 1.05 mm., respectively, and two end blocks 1 according to the invention, which are constructed in the manner illustrated in Figs. 1 to 4 inclusive, and are placed one at each end of the combination. These end blocks each have a dimension $m$ of, for instance, 10 mm., so that the over-all dimension of the entire combination shown in Fig. 5 is 50.05 mm. When the two end blocks 1 are placed in this manner at the two ends of the combination, the top generatrices of the ridges $b$ of the same on opposite ends of the combination, and which are indicated by the dot and dash lines $c^1$ and $c^2$, will appear to cross each other, at an angle of $2\alpha$, when the combination is viewed from one end as shown in Fig. 7. In other words each generatrix, in this instance, is in a plane which is diagonal with respect to and which intersects the center plane of the corresponding end block. In fact, all three planes indicated in Fig. 7, intersect in a common line.

With the combination 1, 4, 3, 2, 1 built up in this manner the working measure of a snap gauge may be checked in the same manner as when a cylindrical reference disk having a diameter of 50.05 mm. is used. The snap gauge may simply be allowed to slide, for instance by its own weight, over the combination in the direction from above downwards in Fig. 6. Owing to the ridges $b$ of the two end blocks 1 being located in such manner that their top generatrices $c^1$ and $c^2$ cross each other, as explained above, the advantage is obtained that the measuring plugs of the snap gauge are sure always to be brought in contact with the said top generatrices $c^1$, $c^2$ of the ridges of the end blocks and will thus slide over the largest dimension 50.05 mm. of the combination.

On the other hand, it is not certain that this would be the case if the ridges $b$ of the end blocks were positioned in such manner that their top generatrices $c^1$, $c^2$ were parallel, unless the ridges $b$ were made as segments of a cylindrical surface having a radius of curvature which happens to be equal to half the over-all dimension of the combination. By inserting other ordinary blocks between the two end blocks 1, a great number of combinations having different dimensions may obviously be obtained, so that in this manner it is possible to replace practically all those reference disks of various sizes which were heretofore required for checking the working measures of a set of snap gauges required for a certain manufacture, by a combination gauge block set according to the invention.

In order to make it possible to build up combinations to take the place of reference disks having a comparatively small diameter, it is suitable in practice to make the additional end blocks 1 with a less dimension $m$ than that above assumed by way of example. It has proved advantageous to make each end block with a dimension of 3 mm. It is not advisable to decrease this dimension still further, since in such case it may be difficult to make the ridges $b$ with the required accuracy.

Since when checking snap gauges in the manner above described, the ridges $b$ on the additional end blocks 1 are obviously subjected to considerable wear, it is advisable in practice to make the said blocks of a considerably harder or more wear-resistant material than the other or ordinary blocks of the set. The end blocks may be made of any suitable well-known so-called hard metal, such as Widia metal, or Stellite metal, or optionally, the surfaces of the ridges may be plated with a layer of chromium which forms a hard wear surface.

Figure 9:
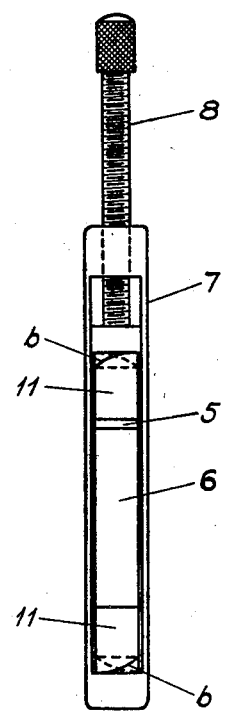

The composite block illustrated in Figs. 8 and 9 is built up of two ordinary blocks 5 and 6 and two additional end blocks 11 according to the invention, which are placed at the ends of the combination comprising the two firstmentioned blocks. All blocks are placed in a holder 7 of a previously known construction having a clamping screw 8. The additional end blocks 11 which in this case are made about twice as long as the ordinary blocks 5 and 6, so that they project outside the holder 7 on one side thereof, are each provided with an accurately plane measuring surface $a$ and, on the side opposite to the said measuring surface and on the portion of the block which projects outside the holder, with a ridge $b$ which may be shaped, for instance, as a portion of a cylindrical surface. Also in this case these ridges are positioned in such manner that their top generatrices form acute angles to the longitudinal center lines of the blocks and lie in planes which are parallel to the accurately plane measuring surfaces $a$ and are at a predetermined distance $m$ therefrom, which distance is the dimension of the end blocks.

By arranging the end blocks in this manner, and by inserting the combination in a holder, the advantage is obtained, particularly in the case of large dimensions, that the composite block is handled more conveniently when checking the working measures of the snap gauges. In order to securely prevent the portions of the end blocks 11 projecting outside the holder from bending inwards toward each other when checking the snap gauges, it may be suitable to insert between the measuring surfaces $a$ of the end blocks a further block 9, which is indicated in dot and dash lines in Fig. 8, and which shall, of course, have the same dimension as the over-all dimension of the blocks 5 and 6.

The constructional forms of the additional end blocks 1 and 11, described here above and illustrated in Figs. 1 to 4, inclusive, and in Figs. 8 and 9, respectively, are only to be regarded as examples, and it is obvious that their details may be further modified in various ways without departing from the principle of the invention. Thus, it is not necessary, for instance, to make the ridges $b$ as cylinder segments, as they may also be given a triangular or other suitable crosssectional form. Furthermore, the ridges need not be straight but, as previously pointed out, they may be made angular or curve-shaped, for instance, and optionally, they may consist of several portions not connected with one another.

I claim:

1. An end block for a combination block gauge set, said end block having opposed surfaces one of which is plane, and the other of which is shaped as a ridge having a linear top which is positioned in a plane which is parallel to the said opposed plane surface and is located at a predetermined distance therefrom, the said linear top of the ridge forming an acute angle to the longitudinal center line of the block.

2. An end block for a combination block gauge set, said end block having opposed surfaces one of which is plane, and the other of which is shaped as a ridge having a linear top which is positioned in a plane which is parallel to the said opposed plane surface and is located at a distance therefrom of the order of 3 mm., the said linear top of the ridge forming an acute angle to the longitudinal center line of the block.

3. An internal measuring block gauge having two opposed exterior measuring surfaces which are shaped as ridges, the linear tops of which are positioned in parallel planes and which lie in intersecting planes normal to the parallel planes.

4. An end block for a combination block gauge set, said end block having opposed surfaces one of which is plane, and the other of which is shaped as a ridge having a straight line top positioned in a plane which is parallel to the said opposed plane surface and is located at a predetermined distance therefrom, said top line being positioned also in a plane at right angles to said opposed plane surface, and which intersects a longitudinal center plane of said block which is also at right angles to said opposed plane surface.

5. An end block for a combination block gauge set, said end block having opposed surfaces one of which is plane, and the other of which is shaped as a ridge forming a top line which is positioned in a plane which is parallel to the said opposed plane surface and is located at a predetermined distance therefrom, at least a portion of the said top line of the ridge forming an angle to the longitudinal center line of the block.

6. An internal measuring block gauge having two opposed exterior measuring surfaces which are shaped as ridges forming top lines which are positioned in parallel planes and at least portions of which lie in intersecting planes normal to the parallel planes.

JOHN OLOF EDVARD JOHANSSON.